US008848889B2

(12) United States Patent
Wood et al.

(10) Patent No.: US 8,848,889 B2
(45) Date of Patent: Sep. 30, 2014

(54) SYSTEM AND METHOD FOR BIOMETRIC IDENTIFICATION OF A CALL ORIGINATOR

(71) Applicant: Nuance Communications, Inc., Burlington, MA (US)

(72) Inventors: Patrick Wood, Raleigh, NC (US); Russell Vetrano, Raleigh, NC (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/747,754

(22) Filed: Jan. 23, 2013

(65) Prior Publication Data
US 2014/0205077 A1    Jul. 24, 2014

(51) Int. Cl.
*H04M 1/56* (2006.01)
*H04M 15/00* (2006.01)
*H04M 11/00* (2006.01)
*H04M 3/42* (2006.01)

(52) U.S. Cl.
CPC ..................... *H04M 3/42* (2013.01)
USPC ............ 379/142.05; 379/93.23; 379/142.04

(58) Field of Classification Search
USPC ............... 379/88.19, 93.03, 142.01, 142.04, 379/142.05, 142.06, 88.01, 88.02, 88.03, 379/218.01; 704/273, 275
See application file for complete search history.

(56) References Cited

U.S. PATENT DOCUMENTS

| 6,104,913 | A | * | 8/2000 | McAllister | ................... 455/41.1 |
| 8,116,436 | B2 | * | 2/2012 | Isenberg | .................... 379/88.02 |
| 2002/0057784 | A1 | * | 5/2002 | Cox et al. | ................. 379/218.02 |
| 2002/0169716 | A1 | * | 11/2002 | Johnson et al. | ................. 705/40 |
| 2004/0170260 | A1 | * | 9/2004 | Baker | ....................... 379/114.01 |
| 2005/0002497 | A1 | * | 1/2005 | Brown et al. | .............. 379/88.01 |
| 2006/0074685 | A1 | * | 4/2006 | Brown et al. | ................. 704/273 |
| 2013/0156171 | A1 | * | 6/2013 | Springer | .................... 379/88.22 |
| 2013/0163743 | A1 | * | 6/2013 | Henry | ...................... 379/218.01 |

* cited by examiner

*Primary Examiner* — Binh Tieu
(74) *Attorney, Agent, or Firm* — Hamilton, Brook, Smith & Reynolds P.C.

(57) ABSTRACT

An embodiment according to the invention provides automatic discovery, via Automatic Speech Recognition (ASR) and Voice Biometrics, of the identification of a caller, when the caller is making a phone call from, for example, a residential line. The caller may, for example, initiate a phone call by voice request to a computer or other device. The device initiates the call, but rather than using the conventional technique of determining Calling Name via lookup to the Transaction Capabilities Application Part (TCAP) database, the embodiment uses a technique of ASR in tandem with voice or other biometrics to recognize who within the residence is making the call, and to use the name associated with the requesting caller's voiceprint for determining the Calling Name to display to the called party. Other forms of biometrics, such as image biometrics (e.g., facial or iris biometrics), may alternatively be employed.

22 Claims, 5 Drawing Sheets

SYSTEM AND METHOD FOR BIOMETRIC IDENTIFICATION OF A CALL ORIGINATOR

BACKGROUND OF THE INVENTION

In a conventional call set-up process, the Calling Name is typically provided via a lookup to a database for a name associated with a calling party's number. For example, the Transaction Capabilities Application Part (TCAP) database is typically used to provide the billable customer's name on file.

However, multiple parties often use a single phone line, such as a residential phone line, so that a called party may not be able to know with certainty which party among the multiple possible calling parties is calling when a call is received that is identified as coming from a given Calling Name.

SUMMARY OF THE INVENTION

An embodiment according to the invention provides automatic discovery, via Automatic Speech Recognition (ASR) and Voice Biometrics, of the identification of a caller, when the caller is making a phone call from, for example, a residential line. The caller may, for example, initiate a phone call by voice request to a computer or other device. The device initiates the call, but rather than using the conventional technique of determining Calling Name via lookup to the Transaction Capabilities Application Part (TCAP) database, the embodiment uses a technique of ASR in tandem with voice or other biometrics to recognize who within the residence is making the call, and to use the name associated with the requesting caller's voiceprint for determining the Calling Name to display to the called party. It should be understood that other forms of biometrics, such as image biometrics (e.g., facial or iris biometrics), may alternatively be employed.

In accordance with an embodiment of the invention, there is provided a system (or corresponding method) for biometric identification of a call originator, the system comprises a call set-up processor configured to obtain an identification of a call originator based on a biometric associated with the call originator. The call set-up processor is further configured to apply the identification of the call originator to a call set-up process.

In further, related embodiments, the call set-up processor may comprise a processor configured to request the identification of the call originator based on a biometric sample signal. The biometric sample signal may comprise a signal representation of a biometric from the group consisting of: voice of the call originator; fingerprint of the call originator; image of the call originator; iris scan of the call originator; and unique effect associated with the call originator. The call set-up processor may comprise a processor configured to determine whether a request to initiate a call comprises a parameter permitting biometric identification of the call originator and, if so, to request identification of the call originator based on a biometric sample signal. The call set-up processor may comprise a processor configured to obtain the identification to distinguish the call originator from among a plurality of different possible users of a device from which the call is originated. The call set-up processor may comprise a processor configured to receive communications from the device via at least one of a public switched telecommunications network and an Internet Protocol network.

The call set-up processor may comprise a processor configured to apply a result of automated voice recognition, performed on a voice signal of the call originator, to the call set-up process. The call set-up processor may comprise a processor configured to: receive a request for initiation of the call from a local device; determine whether it is possible to identify the call originator using a biometric sample signal; and, if so, obtain the identification of the call originator based on the biometric sample signal; and, if not, obtain identification of the call originator based on a default user identification of the local device. The call set-up processor may comprise a processor configured to receive a proposed identity of the call originator and to verify the proposed identity based on the biometric. The call set-up processor may comprise a processor configured to apply the identification of the call originator to the call set-up process by a process comprising determining a call originator identification suppression status based on the identification of the call originator, the identification being based on the biometric associated with the call originator.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

An embodiment according to the invention provides automatic discovery, via Automatic Speech Recognition (ASR) and Voice Biometrics, of the identification of a caller, when the caller is making a phone call from, for example, a residential line. The caller may, for example, initiate a phone call by voice request to a computer or other device. The device initiates the call, but rather than using the conventional technique of determining Calling Name via lookup to the Transaction Capabilities Application Part (TCAP) database, the embodiment uses a technique of ASR in tandem with voice or other biometrics to recognize who within the residence is making the call, and to use the name associated with the requesting caller's voiceprint for determining the Calling Name to display to the called party. It should be understood that other forms of biometrics, such as image biometrics (e.g., facial or iris biometrics), may alternatively be employed.

Conventionally, Calling Name is typically provided via lookup to a database for the name associated with the calling party's number, which is usually the billable customer's name on file. By contrast, an embodiment according to the present invention uses a biometric to permit identification of the caller (if recognized), rather than using the name of the default land line customer of record.

For point-to-point communications, the Session Initiation Protocol (SIP) conventionally provides the capability for a caller to specify directly the originating party's name. By contrast, an embodiment according to the present invention permits an entity, which is being requested to initiate the call, to recognize automatically who is making the request and to update automatically the Calling Name to be used.

An embodiment according to the invention may use speech recognition in tandem with voice biometrics in order to determine the identity of a call originator. Embodiments may be used in a variety of different contexts, including in automobiles and in the home. An embodiment may be of particular advantage in the context of interactions between families and family members in which there are several people associated with a given subscriber's phone number. For example, the system may be used in a residence in which multiple family members share a phone line, which may be a land line or a mobile phone line. The system may also be used with mobile devices that are used by multiple callers, in order to permit verification of the identification of the call originator based on a determination of a name associated with a voiceprint or other biometric.

Figure 1A:
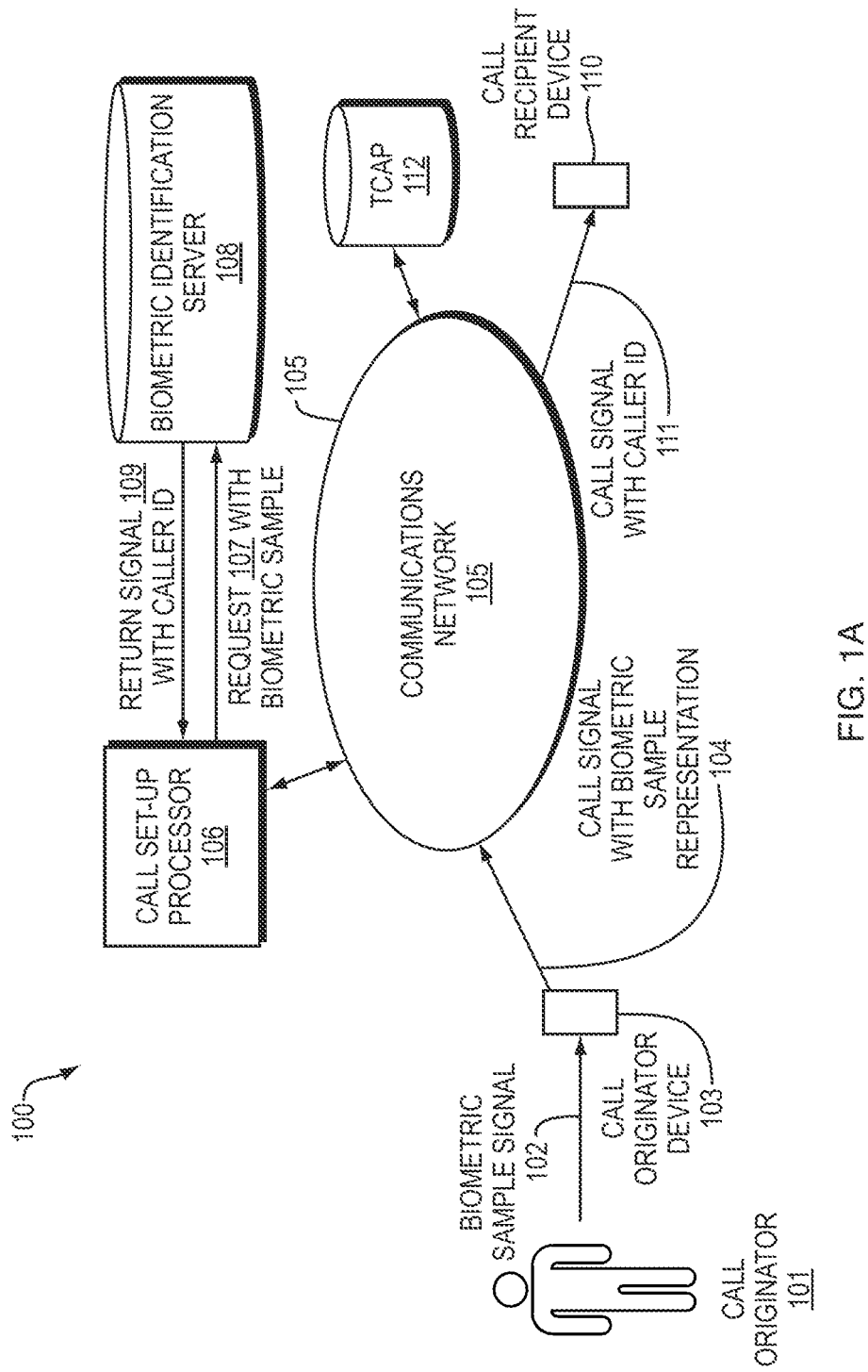
FIG. 1A is a schematic diagram of a system using a call set-up processor in accordance with an embodiment of the invention.

FIG. 1A is a schematic diagram of a system 100 using a call set-up processor in accordance with an embodiment of the invention. A call originator 101 provides a biometric sample signal 102 to a call originator device 103, where the biometric sample signal may include an instruction to originate a call or a portion of an instruction to originate a call. The biometric sample signal 102 may, for example, be a voice command, such as the voice command to initiate a call, or a password voice command, or any other voice signal of the call originator. Other biometric sample signals may be used. For example, the biometric sample signal may be a fingerprint of the call originator, an image of the call originator, an iris scan of the call originator, a unique effect associated with the call originator or another biometric sample signal of the call originator. As used herein, a "unique effect" means an item of property, biological sample, electromagnetic signal embodied in a computer readable medium or another item or signal uniquely associate with the call originator.

In the embodiment of FIG. 1A, the call originator device 103 transmits a call signal 104, which includes the biometric sample signal 102 or an encoded version of it, to a communications network 105. In addition to the biometric sample signal 102, the call signal 104 may include conventional information for completing a call, such as an identification of the recipient device, an identification of the call carrier and other information conventionally used for setting up a call. The call signal 104 is communicated over the communications network 105 to a call set-up processor 106, which may inspect the call signal 104 to determine whether the call signal 104 includes the capability for biometric identification of a call originator, or may be configured to automatically request biometric identification of the call originator. For example, the call set-up processor 106 may inspect the call signal 104 to determine whether it includes a parameter, such as the biometric sample signal 102, which permits biometric identification of the call originator.

In an event that the call signal 104 does include the capability for biometric identification of the call originator, or if the call set-up processor 106 is configured to request such identification automatically, the call set-up processor 106 transmits a request 107 to a biometric identification server 108 to perform biometric identification of the call originator. For example, the request 107 may include the biometric sample signal 102, or an encoded version of it, which was passed to the call set-up processor 106 along with the call signal 104. The biometric identification server 108 may perform biometric identification of the call originator by, for example, consulting a database of stored biometric identifiers, such as voiceprints or other biometric identifiers, which may be stored in unique association with caller identifiers, such as caller names. It will be appreciated that the association of caller identifiers with biometric identifiers may have been performed at a time in advance of the call set-up.

In order to speed operation of the biometric identification server 108, the biometric identifiers may be stored based on an identifier for the call originator device 103, so that only a small number of biometric identifiers need be compared with the biometric sample signal 102. The biometric identification server 108 may compare the biometric sample signal 102 with the biometric identifier, such as a voiceprint, using conventional techniques for performing biometric comparison and identification. Such comparison may, for example, be based on scoring against a voiceprint a pre-specified voice phrase used as the biometric, or may be based on scoring against a voiceprint a freeform speech sample that is not a pre-specified phrase.

If the biometric identification server 108 finds a matching identification for the call originator, it returns that identification to the call set-up processor 106 using a return signal 109. If, on the other hand, the biometric identification server 108 is not able to find a matching identification for the call originator, then it may provide a return signal 109 indicative of that fact to the call set-up processor 106.

Continuing with the embodiment of FIG. 1A, upon receipt of a return signal 109 from the biometric identification server 108, the call set-up processor 106 determines whether the return signal 109 includes a matching identification for the call originator. If so, the call set-up processor 106 applies the identification of the call originator to a call set-up process, such as by changing a Caller Name field in the call set-up information to match the determined identification of the call originator. On the other hand, if the call set-up processor 106 receives a return signal 109 from the biometric identification server 108 indicating that no call originator identity was found, the call set-up processor 106 may follow conventional techniques for determining a Caller Name, such as by consulting the Transaction Capabilities Application Part (TCAP) database 112 to determine the name associated with the calling party's number, which is usually the billable customer's name on file. Once the call originator identity has been determined, the call set-processor 106 completes processing of the call for ultimate delivery to a call recipient device 110 via the communications network 105. A call signal 111 that is delivered to the call recipient device 110 includes the call originator identity name and number determined by the call set-up processor 106, which may be based on the biometric identification of the call originator.

In an embodiment according to the invention, the call originator device 103 may be any of a variety of different possible devices, including a land line phone, mobile phone, "smart" appliance or television, automobile, or any other device configured to receive an instruction to originate a call. The device 103 may be a machine operating on a public switched telecommunications network, or a machine in an Internet Protocol network. The device 103 may be configured to receive, store and transmit a biometric sample signal obtained from the call originator 101, for example a voice signal, fingerprint, image, iris scan and/or a unique effect associated with the call originator 101.

In one embodiment according to the invention, the call originator device 103 may be configured to perform Automatic Speech Recognition (ASR) in addition to obtaining a biometric signal. For example, the call originator device 103 may be configured to use ASR to recognize when a call originator 101 wishes to originate a call, by recognizing a voice command from the call originator 101 to originate the call. The call originator device 103 may use that voice command itself, or an additional voice signal or other biometric sample from the call originator 101, as the biometric sample signal 102 that is forwarded with the call signal 104 to the call set-up processor 106.

In an embodiment according to the invention, the potential call originators 101 that are recognized by the biometric identification server 108 need not be local users of any given call originator device 103, although they may be. In one embodiment, the call set-up processor 106 and biometric identification server 108 may be configured to recognize any of a larger group of potential call originators, regardless of whether they have previously been associated with a given call originator device 103. In addition, the biometric identification server 108 may be a shared resource used by a variety of different call carriers, in much the same way that the Transaction Capabilities Application Part (TCAP) database is currently a shared resource. The call set-up processor 106 may be operated by a call carrier, and may request biometric identification of the call originator 101 from a shared biometric identification server 108. Alternatively, one or more of the call set-up processor 106 and the biometric identification server 108, or one or more of their functions, may be implemented locally, e.g., within the call originator device 103, or remotely, as shown in FIG. 1A. For example, Automatic Speech Recognition (ASR) may be performed locally, while biometric identification is performed remotely using a shared resource, such as a cloud-based biometric identification server 108.

In an embodiment according to the invention, the biometric sample signal 102 that is received by the call originator device 103 need not come directly from the call originator 101. Instead, for example, the call originator 101 may communicate directly with another device, such as a virtual assistant, which then forwards the biometric sample signal 102 to the call originator device 103 to make the call. In addition, the biometric sample signal 102 may be used to authenticate a person for making a call to another device, for example using a biometric voiceprint. This authentication may be used for security purposes, in order to allow or disallow a person from using the call originator device 103 to make a call. In addition, the authentication may be used to allow or disallow the use of call processing services associated with the originating subscriber's line. For example, a call may be initiated to a busy line and the caller requests "barge-in," i.e., putting the current call on hold and connecting to the caller. In accordance with an embodiment of the invention, the biometric sample signal 102 may be used to allow or disallow such a request, or the use of other services associated with the originating subscriber's line, based on the identity of the call originator determined based on the biometric sample signal 102.

In another embodiment according to the invention, the call originator device 103 may perform initial ASR and/or biometric processing to determine whether a call originator 101 requesting to make a call is a default user of the call originator device 103. If the device 103 is unable to recognize the call originator, the call set-up processor 106 may be used to determine the identity of the call originator based on consulting the biometric identification server 108. In addition, the call set-up processor 106 or a processor (not shown) local to the call originator device 103 may undergo initial training with one or more users of the device 103, in order to facilitate recognition of common users of the device 103.

In another embodiment according to the invention, a second processor (not shown) local to, or in, the call originator device 103, or a second processor (not shown) remote from the call originator device 103, may execute biometric identification of the call originator in tandem with the call set-up. For example, the second processor may perform text independent free speech biometric voice recognition. The call originator identity so determined by the second processor may be provided to the call carrier as a proposed call originator identity. The call set-up processor 106 may then verify the call originator identity, for example by performing the technique shown in FIG. 1A. For example, the call set-up processor 106 may verify the proposed call originator identity, provided to it by the second processor, based on a signal, such as an audio signal provided by the call originator, which may for example be provided to the biometric identification server 108. If the call set-up processor 106 verifies the determination made by the second processor, it may use the verified call originator identity as the basis for providing the name (and other identifiers) for delivery to the call recipient device, for example for a Calling Name Delivery service. If the second processor fails to recognize the call originator, the call originator device 103 and/or the call set-up processor 106 could cause the user to be prompted to supply their name (or other identifier) directly. The second processor could be trained to recognize users of the call originator device 103, such as all persons living in a residence.

In an embodiment according to the invention, the call signal 111 may include both the default Caller Name associated with the call originator device 103 and a name determined on the basis of biometric identification. In such a case, the call processor 106 may perform both a biometric identification by consulting the biometric identification server 108 and a standard identification based on a default Caller Name, such as by consulting the TCAP database. Both names may be provided to a call recipient device 111.

In an embodiment according to the invention, for security reasons, a biometric sample signal 102 that is forwarded to the call set-up processor 106 may be encrypted or otherwise encoded, and may be deleted as soon as it is used.

In another embodiment according to the invention, the call set-up processor is configured to apply the identification of the call originator to the call set-up process by a process comprising determining a call originator identification suppression status based on the identification of the call originator, the identification being based on the biometric associated with the call originator. Typically, in a conventional network, suppression of a caller's name is associated with the line or number in which a call is originated. By contrast, in an embodiment according to the present invention, the suppression attribute may be based on the call originator's identity, determined by voiceprint or another biometric. Take, for example, a residential land-line serving a family of four—two adults and two children. The account name of record for the Provider is one of the parents (e.g., John Doe). Therefore, in a conventional system, when calls from this line are originated, CallerID with the account name of record is delivered to the called party, assuming that CallerID (specifically Calling Name Delivery) suppression is not enabled. Thus, conventionally, all calls regardless of the actual person calling abide by the rules associated with CallerID delivery suppression service for that line. However, John's wife Jane may not want name suppression and is, therefore, in a conventional system, is forced to disable CallerID Name suppression (for example via feature access code) prior to making calls.

By contrast, in an embodiment according to the present invention, the suppression status of the caller can be based on the call originator identity determined based on a biometric. For example, the suppression status of the call originator can be stored and/or otherwise associated with the voiceprint or other biometric used for authentication. Alternatively, the suppression status of the call originator may be separately stored from the biometric, and may be accessed once the call originator identification is determined based on the biometric. Thus, in the example above, if Jane requests a virtual assistant make a call, the Voice Biometric system in accordance with an embodiment of the invention can not only authenticate that it is her that is calling (and use her name instead of John's for Caller Name Delivery) but also use the Calling Name suppression associated with her identity, such as by association with her voiceprint. Thus, when Caller Name Delivery is attempted, it is allowed (or blocked), depending on her default setting, for the calls that she makes. An embodiment according to the invention can store a subscriber's Name Delivery Suppression status in a way that is unique to their voiceprint or other biometric, for example using a lookup table associating the caller's identity and/or biometric with the caller's suppression status. Therefore, calls originated via voice to a system with integrated voice biometrics for caller name authentication can use the corresponding suppression status as well.

In an embodiment according to the invention, processes described as being implemented by the call set-up processor may be implemented by component processors configured to perform the described processes. For example, the call set-up processor may comprise a component processor configured to obtain an identification of a call originator based on a biometric associated with the call originator; and another component processor configured to apply the identification of the call originator to a call set-up process. Such component processors may be implemented on a single machine, on multiple different machines, in a distributed fashion in a network, or as program module components implemented on any of the foregoing. As used herein, it will be appreciated that for the call set-up processor to "obtain" an identification of a call originator can mean that the call set-up processor either obtains the identification itself, such as by performing processing of its own, or obtains it from another system or processor (such as biometric identification server 108), or a combination of those. In addition, a call set-up processor may include a processor performing some or all of the functions described herein as being implemented, in one embodiment, by a biometric identification server 108.

Figure 1B:
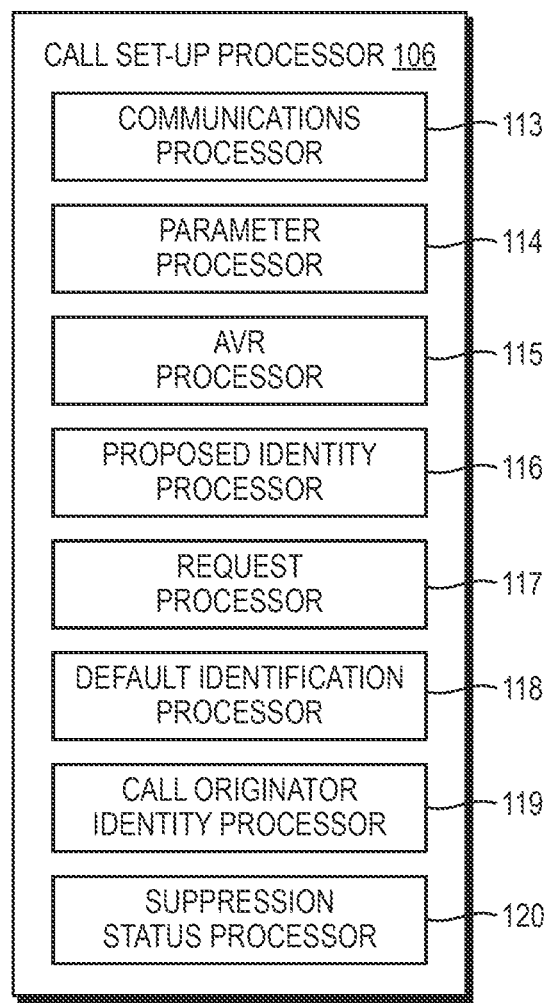
FIG. 1B is a schematic diagram of components of a call set-up processor in accordance with an embodiment of the invention.

FIG. 1B is a schematic diagram of components of a call set-up processor in accordance with an embodiment of the invention. The call set-up processor 106 includes a communications processor 113 configured to receive communications from the device 103 via a public switched telecommunications network or via an Internet Protocol network. Further, the call set-up processor 106 includes a parameter processor 114 configured to determine whether a request to initiate a call comprises a parameter permitting biometric identification of the call originator and, if so, to request identification of the call originator based on a biometric sample signal (the request may also be performed by a request processor 117). An automated voice recognition processor 115 is configured to apply a result of automated voice recognition, performed on a voice signal of the call originator, to the call set-up process. A proposed identity processor 116 is configured to receive a proposed identity of the call originator and to verify the proposed identity based on the biometric (the verification may also be performed by a request processor 117). A request processor 117 is configured to obtain an identification of a call originator based on a biometric associated with the call originator, for example by requesting the identification of the call originator based on a biometric sample signal. The identification may be used to distinguish the call originator from among a plurality of different possible users of a device from which the call is originated. A default identification processor 118 is configured to obtain identification of the call originator based on a default user identification of the local device (such as by consulting TCAP database 112). A call originator identity processor 119 is configured to apply the identification of the call originator to a call set-up process. A suppression status processor 120 is configured to apply the identification of the call originator to the call set-up process by a process comprising determining a call originator identification suppression status based on the identification of the call originator, the identification being based on the biometric associated with the call originator. It will be appreciated that other processors, and other arrangements of processing, taught herein may be used.

Figure 1C:
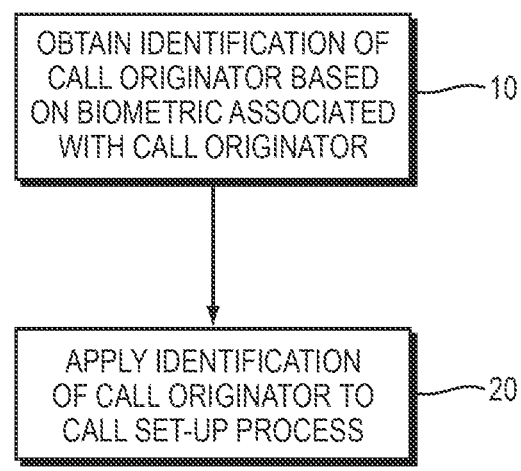
FIG. 1C is a block diagram of a method implemented by the systems of FIGS. 1A and 1B, in accordance with an embodiment of the invention.

FIG. 1C is a block diagram of a method implemented by the systems of FIGS. 1A and 1B, in accordance with an embodiment of the invention. The method comprises obtaining 10 the identification of a call originator based on a biometric associated with the call originator; and applying 20 the identification of the call originator to a call set-up process. It will be appreciated that related methods may be implemented in accordance with teachings herein.

Figure 2:
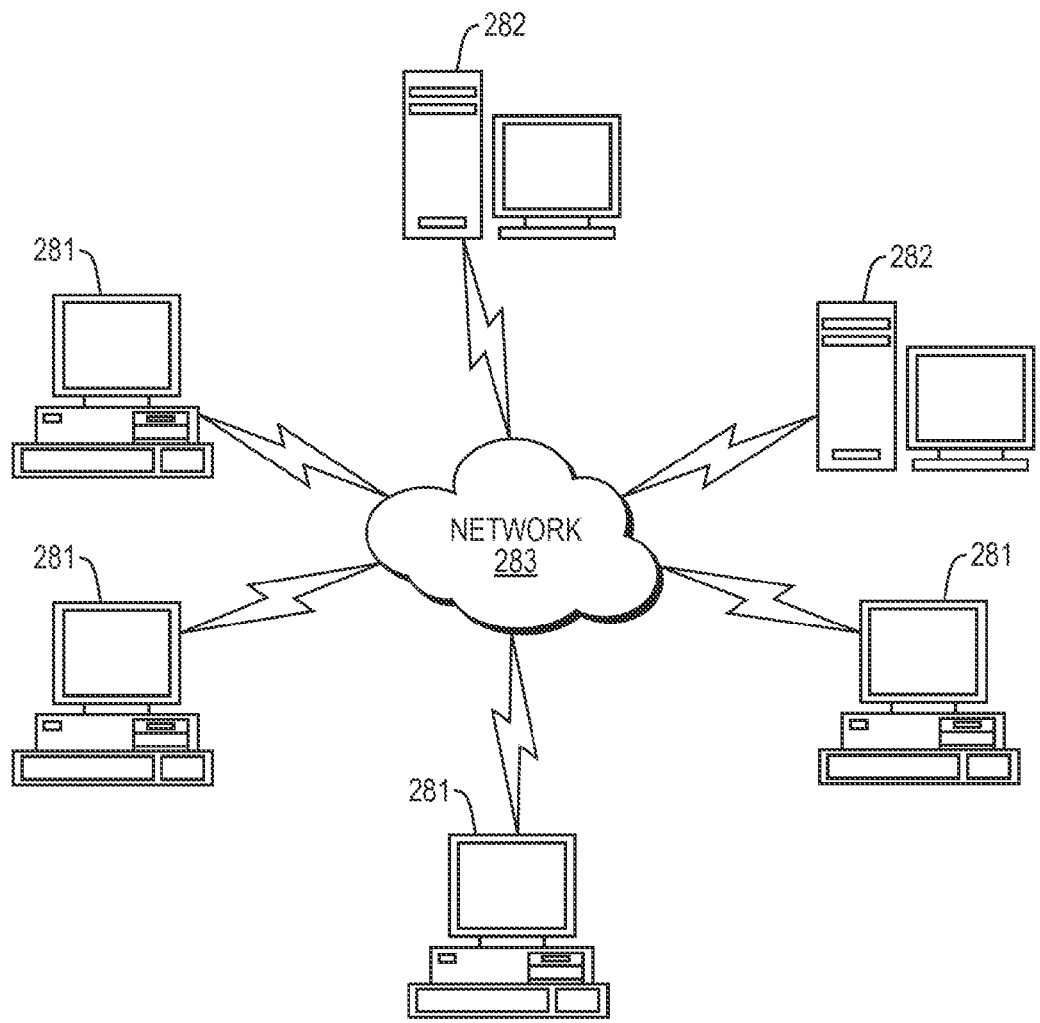
FIG. 2 illustrates a computer network or similar digital processing environment in which the present invention may be implemented.

FIG. 2 illustrates a computer network or similar digital processing environment in which the present invention may be implemented. Client computer(s)/devices 281 and server computer(s) 282 provide processing, storage, and input/output devices executing application programs and the like. Client computers 281 can include, for example, the computers used to implement a call set-up processor 106, in accordance with an embodiment of the invention; and server computers 282 can include a biometric identification server 108, in accordance with an embodiment of the invention. Client computer(s)/devices 281 can also be linked through a communications network 283 to other computing devices, including other client devices/processes 281 and server computer(s) 282. The communications network 283 can be part of a remote access network, global network (e.g., the Internet), worldwide collection of computers, Local area or Wide area networks, and gateways that currently use respective protocols (TCP/IP, Bluetooth, etc.) to communicate with one another. Other electronic device/computer network architectures are suitable.

Figure 3:
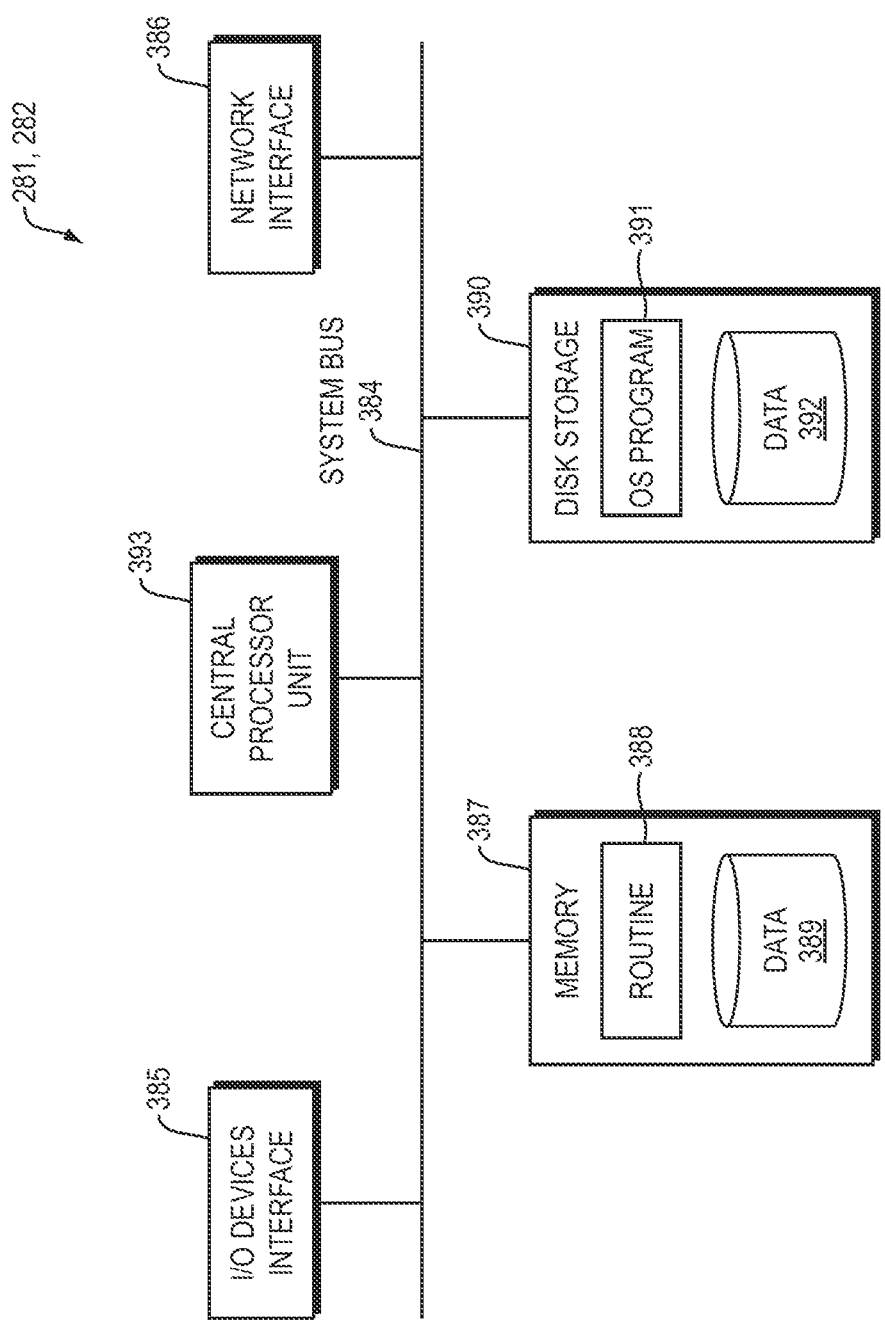
FIG. 3 is a diagram of an example internal structure of a computer in the computer system of FIG. 2, in accordance with an embodiment of the invention.

FIG. 3 is a diagram of an example internal structure of a computer (e.g., client processor/device 281 or server computers 282) in the computer system of FIG. 2, in accordance with an embodiment of the invention. Each computer 281, 282 contains a system bus 384, where a bus is a set of hardware lines used for data transfer among the components of a computer or processing system. The system bus 384 is essentially a shared conduit that connects different elements of a computer system (e.g., processor, disk storage, memory, input/output ports, network ports, etc.) that enables the transfer of information between the elements. Attached to the system bus 384 is an I/O device interface 385 for connecting various input and output devices (e.g., keyboard, mouse, displays, printers, speakers, etc.) to the computer 281, 282. A network interface 386 allows the computer to connect to various other devices attached to a network (e.g., the network 283 of FIG. 2). Memory 387 provides volatile storage for computer software instructions 388 and data 389 used to implement an embodiment of the present invention (e.g., routines for biometric identification of a call originator). A disk storage 390 provides non-volatile storage for computer software instructions 391 and data 392 used to implement an embodiment of the present invention. A central processor unit 393 is also attached to the system bus 384 and provides for the execution of computer instructions.

A system in accordance with the invention has been described in which there is provided biometric identification of a call originator. Components of such a system, for example components of a call set-up processor, biometric identification server and other systems described herein may, for example, be a portion of program code, operating on a computer processor.

Portions of the above-described embodiments of the present invention can be implemented using one or more computer systems, for example to perform biometric identification of a call originator. For example, the embodiments may be implemented using hardware, software or a combination thereof. When implemented in software, the software code can be stored on any form of non-transient computer-readable medium and loaded and executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, at least a portion of the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention described above. The computer readable medium or media can be transportable, such that the program or programs stored thereon can be loaded onto one or more different computers or other processors to implement various aspects of the present invention as discussed above.

In this respect, it should be appreciated that one implementation of the above-described embodiments comprises at least one computer-readable medium encoded with a computer program (e.g., a plurality of instructions), which, when executed on a processor, performs some or all of the above-discussed functions of these embodiments. As used herein, the term "computer-readable medium" encompasses only a non-transient computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Other non-exhaustive examples of computer-readable media include a computer memory (e.g., a ROM, a RAM, a flash memory, or other type of computer memory), a magnetic disc or tape, an optical disc, and/or other types of computer-readable media that can be considered to be a machine or a manufacture.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A system for biometric identification of a call originator, the system comprising:

a call set-up processor configured to obtain an identification of a call originator based on a biometric associated with the call originator, the call set-up processor being further configured to obtain the identification to distinguish the call originator from among a plurality of different possible users associated with a single subscriber account; and the call set-up processor being further configured to apply the identification of the call originator to call set-up information via a call set-up process, the call set-up information including a Caller Name, the call set-up processor basing the Caller Name on the identification of the call originator so obtained, the call set-up information comprising information for completing the call, including an identification of a call recipient device and an identification of a call carrier to enable the identification of the call originator to be delivered as a caller identification to the call recipient device.

2. A system according to claim 1, wherein the call set-up processor comprises a processor configured to request the identification of the call originator based on a biometric sample signal.

3. A system according to claim 2, wherein the biometric sample signal comprises a signal representation of a biometric from the group consisting of: voice of the call originator; fingerprint of the call originator; image of the call originator; iris scan of the call originator; and unique effect associated with the call originator.

4. A system according to claim 1, wherein the call set-up processor comprises a processor configured to determine whether a request to initiate a call comprises a parameter permitting biometric identification of the call originator and, if so, to request identification of the call originator based on a biometric sample signal.

5. A system according to claim 1, wherein the call set-up processor comprises a processor configured to obtain the identification to distinguish the call originator from among a plurality of different possible users of a device from which the call is originated.

6. A system according to claim 5, wherein the call set-up processor comprises a processor configured to receive communications from the device via at least one of a public switched telecommunications network and an Internet Protocol network.

7. A system according to claim 1, wherein the biometric comprises a voice signal of the call originator comprising at least a portion of a voice command to originate the call.

8. A system according to claim 1, wherein the call set-up processor comprises a processor configured to: receive a request for initiation of the call from a local device; determine whether it is possible to identify the call originator using a biometric sample signal; and, if so, obtain the identification of the call originator based on the biometric sample signal; and, if not, obtain identification of the call originator based on a default user identification of the local device.

9. A system according to claim 1, wherein the call set-up processor comprises a processor configured to receive a proposed identity of the call originator and to verify the proposed identity based on the biometric.

10. A system according to claim 1, wherein the call set-up processor comprises a processor configured to apply the identification of the call originator to the call set-up process by a process comprising determining a call originator identification suppression status based on the identification of the call originator, the identification being based on the biometric associated with the call originator.

11. A method of biometric identification of a call originator, the method comprising:
  obtaining an identification of a call originator based on a biometric associated with the call originator to distinguish the call originator from among a plurality of different possible users associated with a single subscriber account; and
  applying the identification of the call originator to call set-up information via a call set-up process, the call set-up information including a Caller Name, the call set-up processor basing the Caller Name on the identification of the call originator so obtained, the call set-up information comprising information for completing the call, including an identification of a call recipient device and an identification of a call carrier to enable the identification of the call originator to be delivered as a caller identification to the call recipient device.

12. A method according to claim 11, further comprising requesting the identification of the call originator based on a biometric sample signal.

13. A method according to claim 12, wherein the biometric sample signal comprises a signal representation of a biometric from the group consisting of: voice of the call originator; fingerprint of the call originator; image of the call originator; iris scan of the call originator; and unique effect associated with the call originator.

14. A method according to claim 11, further comprising:
  determining whether a request to initiate a call comprises a parameter permitting biometric identification of the call originator; and
  if so, requesting identification of the call originator based on a biometric sample signal.

15. A method according to claim 11, comprising receiving communications via at least one of a public switched telecommunications network and an Internet Protocol network.

16. A method according to claim 11, wherein the biometric comprises a voice signal of the call originator comprising at least a portion of a voice command to originate the call.

17. A method according to claim 11, the method comprising:
  receiving a request for initiation of the call from a local device;
  determining whether it is possible to identify the call originator using a biometric sample signal; and
  if so, obtaining the identification of the call originator based on the biometric sample signal; and
  if not, obtaining identification of the call originator based on a default user identification of the local device.

18. A method according to claim 11, further comprising receiving a proposed identity of the call originator and verifying the proposed identity based on the biometric.

19. A method according to claim 11, wherein applying the identification of the call originator to the call set-up process comprises determining a call originator identification suppression status based on the identification of the call originator, the identification being based on the biometric associated with the call originator.

20. A non-transient computer-readable storage medium having computer-readable code stored thereon, which, when loaded and executed by a computer processor, causes the computer processor to perform biometric identification of a call originator, by causing the processor to:
  obtain an identification of a call originator based on a biometric associated with the call originator to distinguish the call originator from among a plurality of different possible users associated with a single subscriber account; and
  apply the identification of the call originator to call set-up information via a call set-up process, the call set-up information including a Caller Name, the call set-up processor basing the Caller Name on the identification of the call originator so obtained, the call set-up information comprising information for completing the call, including an identification of a call recipient device and an identification of a call carrier to enable the identification of the call originator to be delivered as a caller identification to the call recipient device.

21. A system according to claim 1, wherein the biometric comprises a biometric forwarded to a call originator device from a virtual assistant.

22. A method according to claim 11, wherein the biometric comprises a biometric forwarded to a call originator device from a virtual assistant.

* * * * *